United States Patent
Chaleff et al.

(10) Patent No.: US 6,912,076 B2
(45) Date of Patent: Jun. 28, 2005

(54) COPLANAR CAMERA SCANNING SYSTEM

(75) Inventors: Edward I. Chaleff, Doylestown, PA (US); Thomas J. Brobst, Allentown, PA (US); Richard J. Skokowski, Jr., Warminster, PA (US)

(73) Assignee: Accu-Sort Systems, Inc., Telford, PA (US)

( * ) Notice: Subject to any disclaimer, the term of this patent is extended or adjusted under 35 U.S.C. 154(b) by 0 days.

(21) Appl. No.: 10/982,820

(22) Filed: Nov. 5, 2004

(65) Prior Publication Data

US 2005/0094236 A1 May 5, 2005

Related U.S. Application Data (63) Continuation-in-part of application No. 10/676,834, filed on Sep. 30, 2003, now Pat. No. 6,856,440, which is a continuation of application No. 09/810,204, filed on Mar. 16, 2001, now Pat. No. 6,628,445.
(60) Provisional application No. 60/190,273, filed on Mar. 17, 2000.

(51) Int. Cl.[7] ............................................. G02B 26/08
(52) U.S. Cl. ........................ 359/205; 359/204; 235/454
(58) Field of Search ................................. 359/196–226, 359/710, 742, 822–823; 235/454, 462.11, 462.17, 462.22–462.24, 462.32, 462.41, 462.42; 250/201.2, 227.2, 227.26, 234; 358/475, 482–483, 494, 497

(56) References Cited

U.S. PATENT DOCUMENTS 6,830,189 B2 * 12/2004 Tsikos et al. .......... 235/462.22
2003/0156303 A1 * 8/2003 Schnee et al.

* cited by examiner

Primary Examiner—James Phan
(74) Attorney, Agent, or Firm—Volpe and Koenig, P.C.

(57) ABSTRACT

A system for scanning objects having at least two linear array sensors, adapted to detect light input signals, is provided. A lens is optically connected to each of the linear array sensors, and are adapted to receive and transmit an optical image located in a respective lens field of view along a respective lens axis to the respective one of the at least two linear array sensor. A light source which generates an illumination stripe in general linear alignment with the lens axis across a depth of the field of view is provided. A cylindrical lens is positioned between the light source and an object to be scanned. The cylindrical lens adapted to collect, transmit and focus light from the light source to form the illumination stripe. This arrangement provides a wider system field of view with generally more uniform resolution.

19 Claims, 10 Drawing Sheets

COPLANAR CAMERA SCANNING SYSTEM

CROSS-REFERENCE TO RELATED APPLICATIONS

This application is a continuation-in-part of U.S. application Ser. No. 10/676,834, filed Sep. 30, 2003 now U.S. Pat. No. 6,856,440, which is a continuation of U.S. application Ser. No. 09/810,204, filed Mar. 16, 2001, now U.S. Pat. No. 6,628,445, which claims the benefit of U.S. Provisional Application No. 60/190,273, filed Mar. 17, 2000.

BACKGROUND

The present invention relates generally to optical scanning systems. More particularly, this invention relates to a scanning system containing a camera using a coplanar light source.

Various optical scanning systems have been developed for reading and decoding coded symbologies, identification of objects, comparison of objects, and measurement of objects. Each of these scanning systems utilizes either a non-coherent or coherent light source. Lighting is one of the key elements in obtaining good image quality. The intensity of light needed for scanning is directly proportional to the transport speed of the scanned object and the speed of the sensor. Generally, the faster an image is to be acquired, the more light is needed. Until now, only high intensity sodium or halogen lighting was adequate to obtain crisp images in cameras that focus over a significant depth of field at high speeds. The light source is usually located off axis from the camera and sensor detecting the light reflected from the object being scanned.

In applications using sodium lamps as a light source, the lamps are used to provide the illumination required by the camera detection means. These lamps provide an abundance of optical power because they are very bright and have a wide spectral range. There are, however, several disadvantages to sodium lamp light and possible hazard to workers working in the vicinity of the scanning systems. Second, sodium lights require a large amount of AC power, thus increasing production costs. Third, these light sources create a large amount of heat. Additionally, radio frequency interference can be created which can present operational problems to equipment in the vicinity of the scanning system.

The use of light sources such as LEDs presents several advantages over sodium and halogen lighting. LED illumination is a more cost effective and ergonomic method of illumination. The problem presented by LED illumination is how to get enough light to the object that is being imaged when focusing over a large depth of field. By eliminating the mounting angle between the light source and the line of sight of the camera lens, the reflected light is managed and a lower intensity light source may be used. Because LEDs can be energized almost instantaneously, they can be de-energized when objects are not being transported within the field of view. This extends the life of the LEDs and also conserves power. Additionally, the power input to individual LEDs may be modulated and pinpointed to a desired area, such that different LEDs within an LED array may be energized at different levels according to the desired application.

The use of a coherent or non-coherent light source which will provide sufficient optical illumination to an object to be scanned, which uses less energy while alleviating potential problems of radio frequency interference or heat emission is needed.

SUMMARY OF THE INVENTION

Briefly stated, the present invention provides an optical scanning system which uses a light source to provide an illumination stripe that is optically coplanar to a camera lens and light sensor for barcode reading applications. The light source may be coplanar to the lens axis and light sensor, and preferably is formed from LEDs or other low power consumption illumination sources. The coplanar design provides adequate illumination for a large depth of field at low speeds.

In another aspect, the invention provides a scanning system in which the light source is shifted relative to the line of sight of the camera such that the illumination stripe remains coplanar with the camera line of sight at the required depth of field. The light stripe profile coming from the array can therefore be narrow. The intensity of light required to illuminate an object over the depth of field is significantly reduced, thus allowing for the use of an LED array or other low power light source.

In another aspect, the invention provides a plurality of off-axis light sources to provide an illumination stripe on the object generally coplanar with camera line of sight at the required depth of field. Different arrays of lights sources are energized according to the depth of field of the target object, allowing adequate lighting over a range of distances.

In another aspect, the present invention provides an optical scanning system which uses a light source to provide an illumination stripe that is coplanar to at least two lenses and light sensors for imaging applications. The light source is preferably optically coplanar to the axes of the lenses and light sensors, and preferably is formed from LEDs or other low power consumption illumination sources. The design provides broader imaging capability for wide width conveyors or higher density imaging, along with more uniform resolution of the scanned symbologies or images.

DETAILED DESCRIPTION OF THE PREFERRED EMBODIMENTS

The present invention will be described with reference to the drawing figures wherein like numerals represent like elements throughout.

Figure 1:
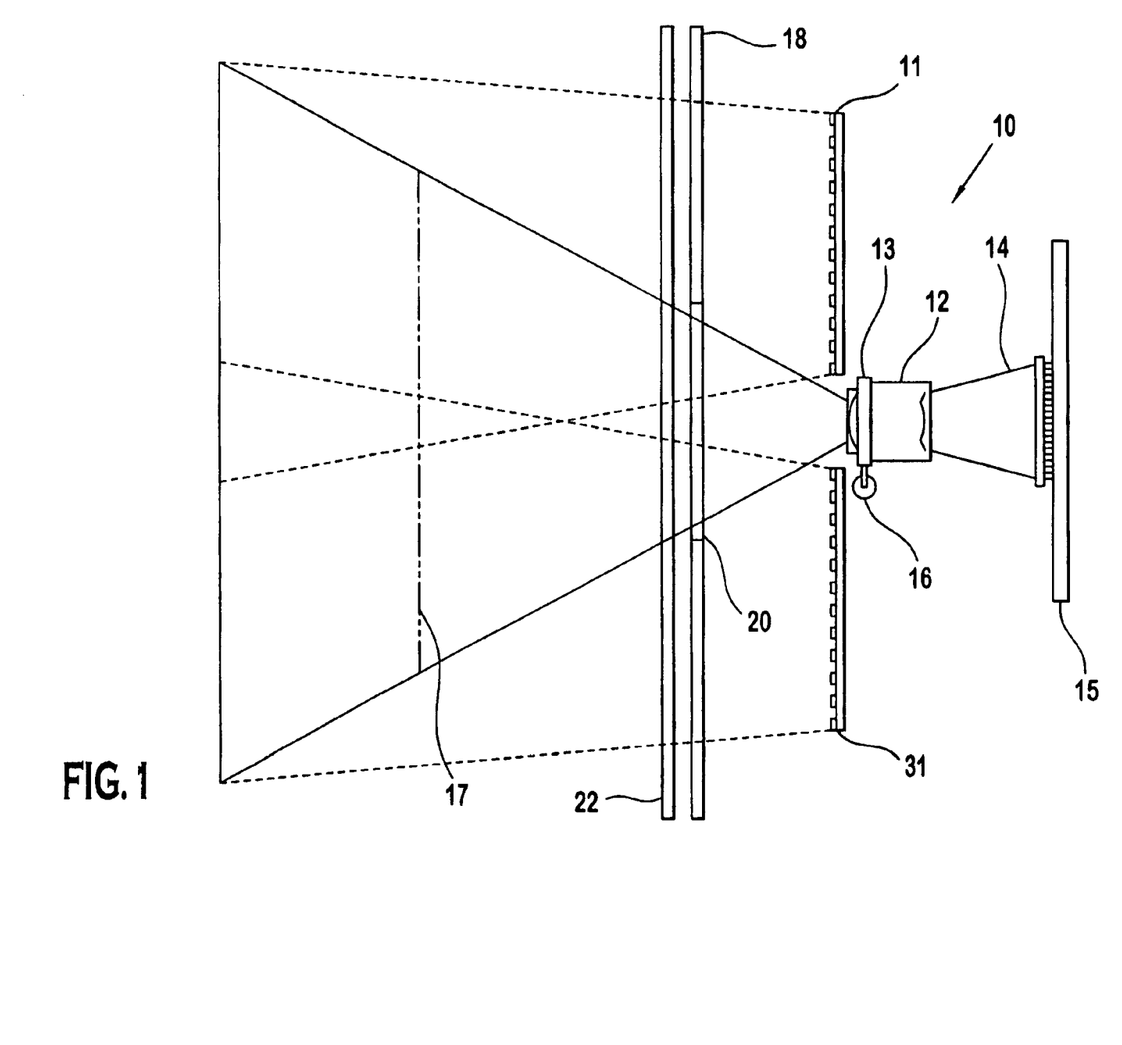
FIG. 1 is a side view of the coplanar camera in accordance with the preferred embodiment of the present invention.

Referring to FIG. 1, a coplanar camera scanning system 10 in accordance with the present invention is shown. The coplanar camera scanning system 10 preferably includes a light source 11, a camera lens 12, a focusing ring 13 for the lens 12, a linear array sensor 14, a window 22, a cylindrical lens 18, and a voice coil actuator 16. In the preferred embodiment, the light source 11 is comprised of one or more very high intensity LED arrays, although those skilled in the art will recognize other suitable lighting could be utilized, such as lasers or a laser line generator.

The light source 11 is used to illuminate a surface of a target object, indicated by broken line 17. The emitted light illuminates the target object and is reflected back to the coplanar aligned sensor 14. The coplanar camera scanning system 10 is preferably used to read barcode information from the scanned object. The coplanar camera scanning system 10 preferably utilizes a CMOS linear array sensor 14 to detect the light reflected from the object being scanned. In the first preferred embodiment a CMOS-based image sensor is referenced, but as those skilled in the art should know, any image sensor can be used, e.g., a CCD-based image sensor. The light reflected onto the CMOS linear array sensor 14 is generated in the preferred embodiment by very high intensity LEDs 11. The preferred embodiment of the present invention utilizes red LEDs within the array. As the technology regarding light sources advances, brighter, more intense LEDs can be used, including LEDs having different wavelengths. Also low power semiconductor lasers can be utilized.

Figure 2:
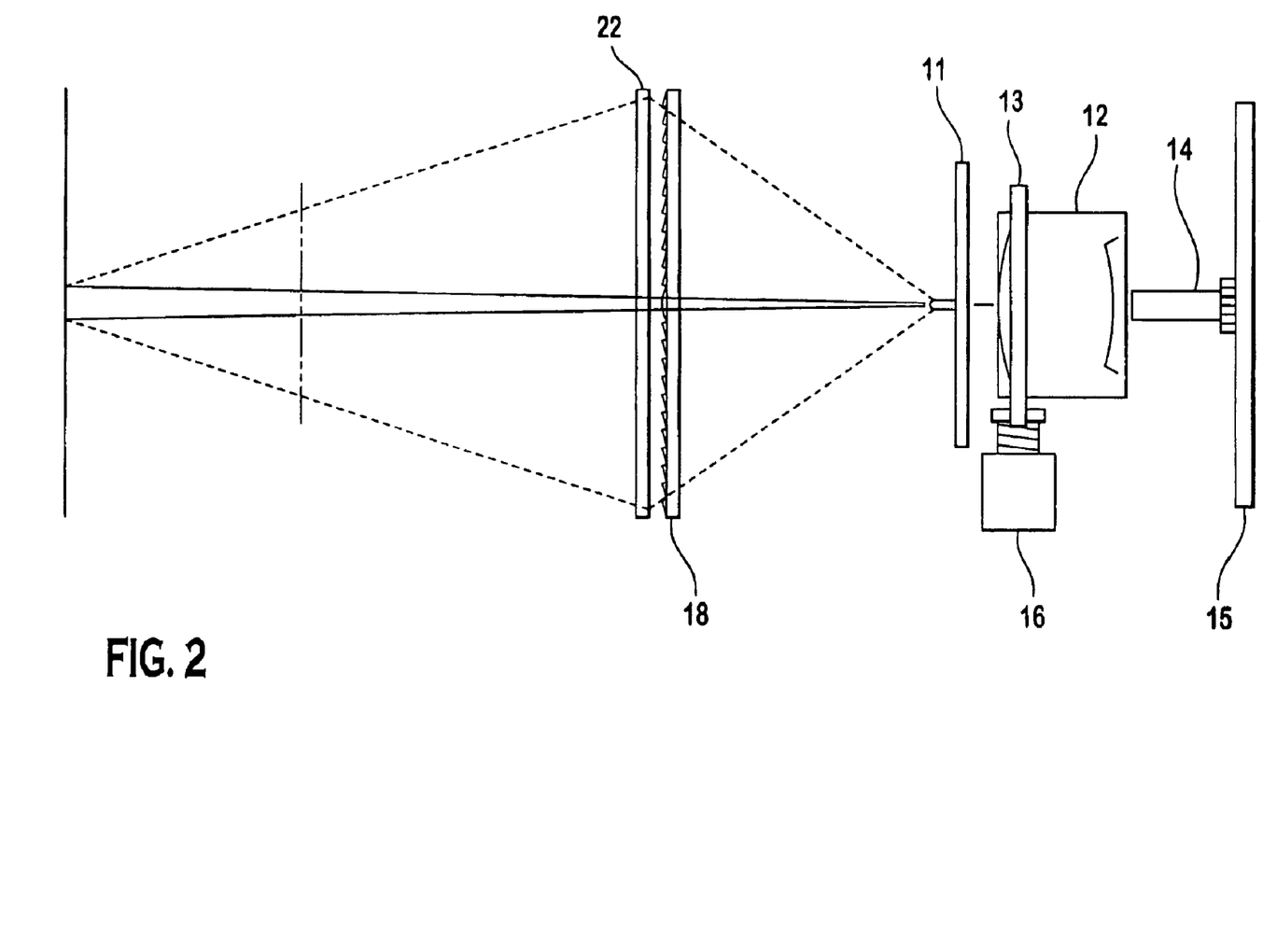
FIG. 2 is a top view of the coplanar camera in accordance with the preferred embodiment of the present invention.

The LED array 11 acts as the light source for the coplanar camera scanning system 10. As shown in FIG. 2, in the first preferred embodiment of the present invention, the light source 11 is positioned parallel to, and in the same plane as the CMOS linear array sensor 14. Those skilled in the art should realize that the light source 11 positioned in this manner is on-axis with the CMOS linear array sensor 14. The light source 11 preferably comprises a plurality of LEDs in series with each other, located on one or more circuit boards 31. In this embodiment, the coplanar camera utilizes two LED arrays to generate the required amount of light. In this embodiment, the light source 11 is positioned on each side of the camera lens 12. As should be clear to those skilled in the art, the number of LEDs required for each light source 11 differs based on the size of the conveyor belt and required depth of field. The present invention preferably utilizes 50 LEDs in each of the up to four arrays, totaling 200 LEDs. Alternatively, a desired number of low power semiconductor laser arrays may be mounted on the circuit board 31.

The light emitted from the light source 11 is focused to a narrow "stripe" on the object using a cylindrical lens 18. This cylindrical lens 18 is positioned parallel to and in between the light source 11 and the target object. In the present preferred embodiment a Fresnel lens is used, but as those skilled in the art should realize, any optical lens can be used in this application. As shown in FIGS. 1 and 2, the positioning of the cylindrical lens in relation to the light source 11 provides an illumination plane that can define a narrow "stripe" of light anywhere within the depth of field. When the target object enters this scanning field, the illumination from the light source 11 illuminates the object. Due to the positioning of the sensor 14 relative to the light source 11, the CMOS linear array sensor 14 detects the most intense light provided by the light source 11.

Figure 3:
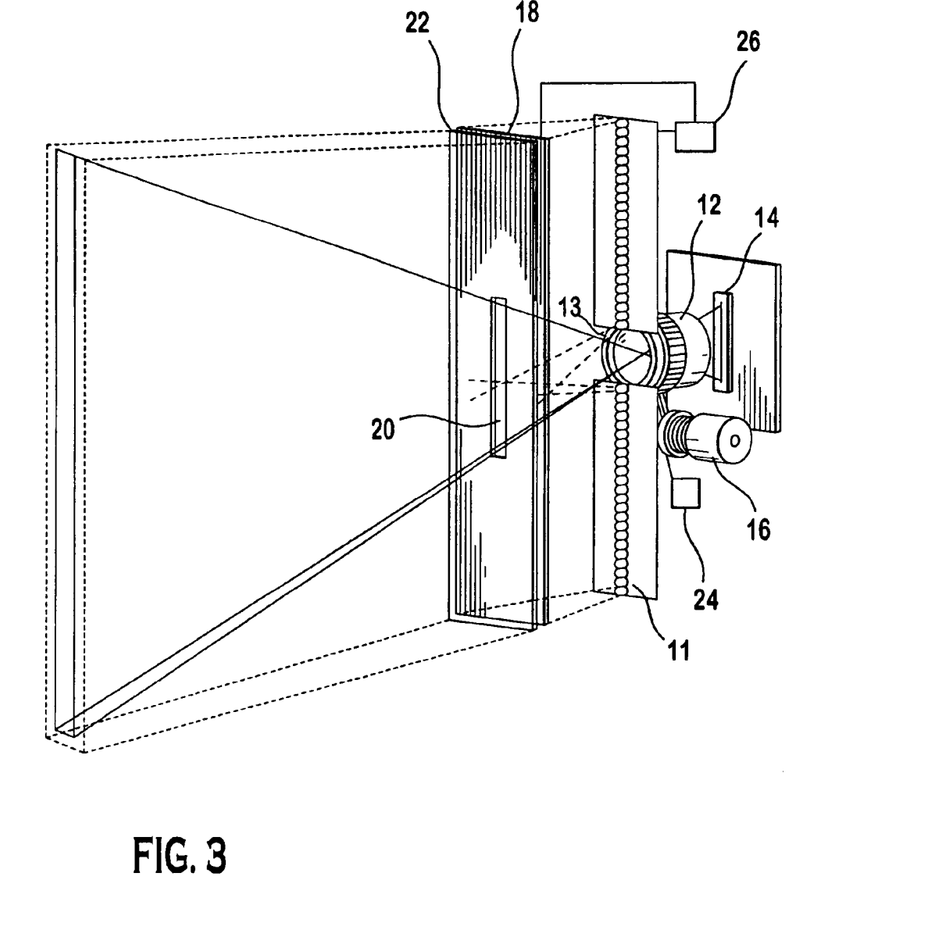
FIG. 3 is a front isometric view of the coplanar camera in accordance with the preferred embodiment of the invention.

As shown in FIGS. 1 and 3, the cylindrical lens 18 includes a center slit 20. This center slit 20 permits the light reflected from the target object to return through the cylindrical lens 18 to the camera lens 12 and then projected onto the CMOS linear array sensor 14.

In order to maximize the depth of field of the coplanar camera scanning system 10, the voice coil actuator 16 is coupled to the focusing ring 13 of the imaging lens 12 to dynamically focus the image onto the CMOS linear array sensor 14, based on a signal from a range finder 24. Those skilled in the art should recognize that there are many methods and apparatuses that can be used as range finders and for focusing. The signal received from the range finder 24 causes the voice coil actuator 16 to move the camera lens 12 and focus the light reflected from the object onto the linear array sensor 14.

Optionally, the invention may include a focusing mechanism 26 for the light source to more accurately focus the emitted light onto a scanned object. This enhances the image which is received by the camera lens 12 and projected onto the CMOS linear array sensor 14. The focusing mechanism 26 is coupled to the light source 11, and dynamically moves the position of the lens 18 with respect to the position of the light source 11. It should be noted that either the focusing mechanism 26 or the light source 11, or both, may be moved to focus the light. Such movement, of course, depends on the distance of the object from the co-planer camera 10. This alternative embodiment keeps the intensity of the illumination stripe maximized at any distance, providing a cleaner image for detection by the CMOS linear array sensor 14.

Figure 4:
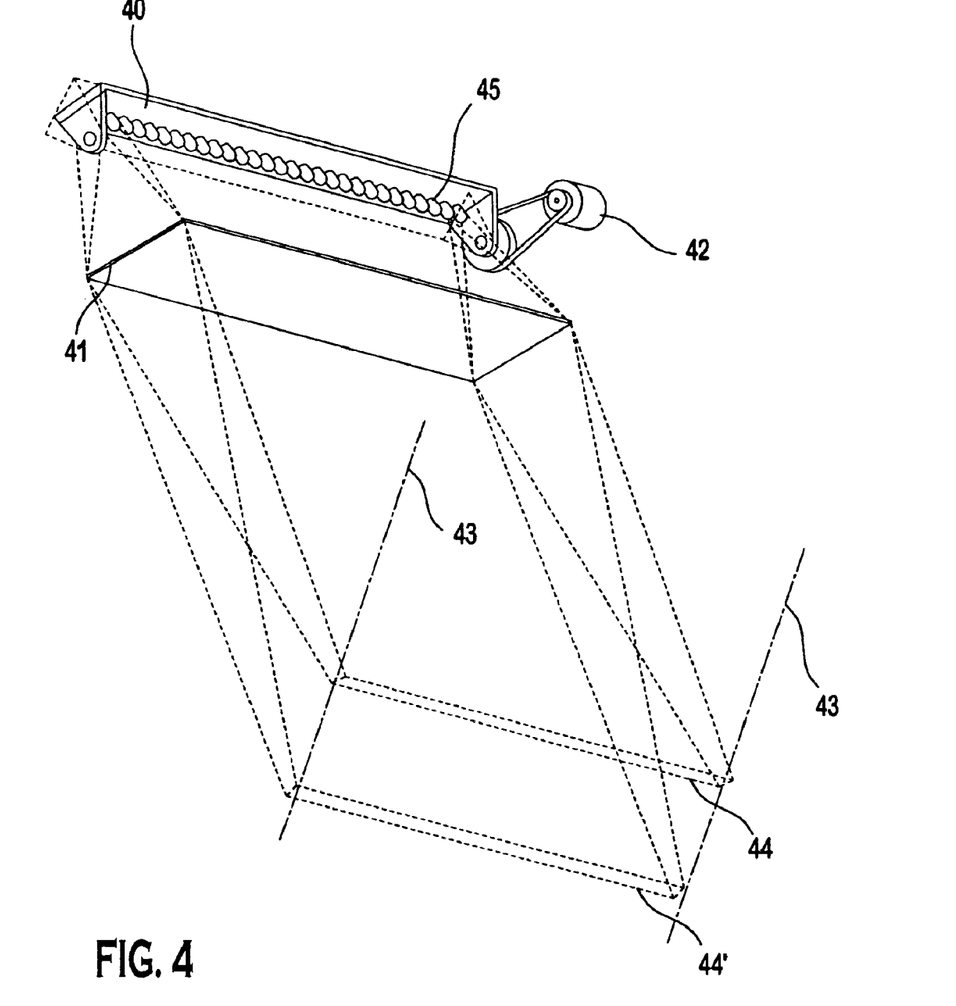
FIG. 4 is a side isometric view of a second embodiment of the invention with a movable array of light sources used in an off-camera lens axis orientation in accordance with the present invention.

Referring to FIG. 4, a second embodiment of the present invention uses an off axis light source 40 which is located off the camera lens axis and the linear array sensor, as represented by lines 43. The off axis light source 40 illuminates a target object by directing a beam of light onto its surface. However, the focused illumination stripe 44 is coplanar with the camera lens axis 43 and the linear sensor array at the required depth of field. The off axis light source 40 is preferably a movable array of LED sources 45 adapted to provide light to the target object. The invention, however, is not limited to this particular configuration or light source, as those skilled in the art will recognize alternative light sources from those described, such as semiconductor lasers, may be used.

The light source 40 may be focused by using an optional lens 41. The lens 41 may be any optical type lens, although a Fresnel lens is preferred. A light source positioner 42, preferably in the form of a controllable motor is connected to the light source 40 to allow movement of the light source 40. The positioner 42 is adapted to move the light source 40 based on a height of an object to be scanned, such that the focused illumination stripe 44, 44' is located on the surface of the object. The object height may be determined by a range finder or other means.

Figure 5:
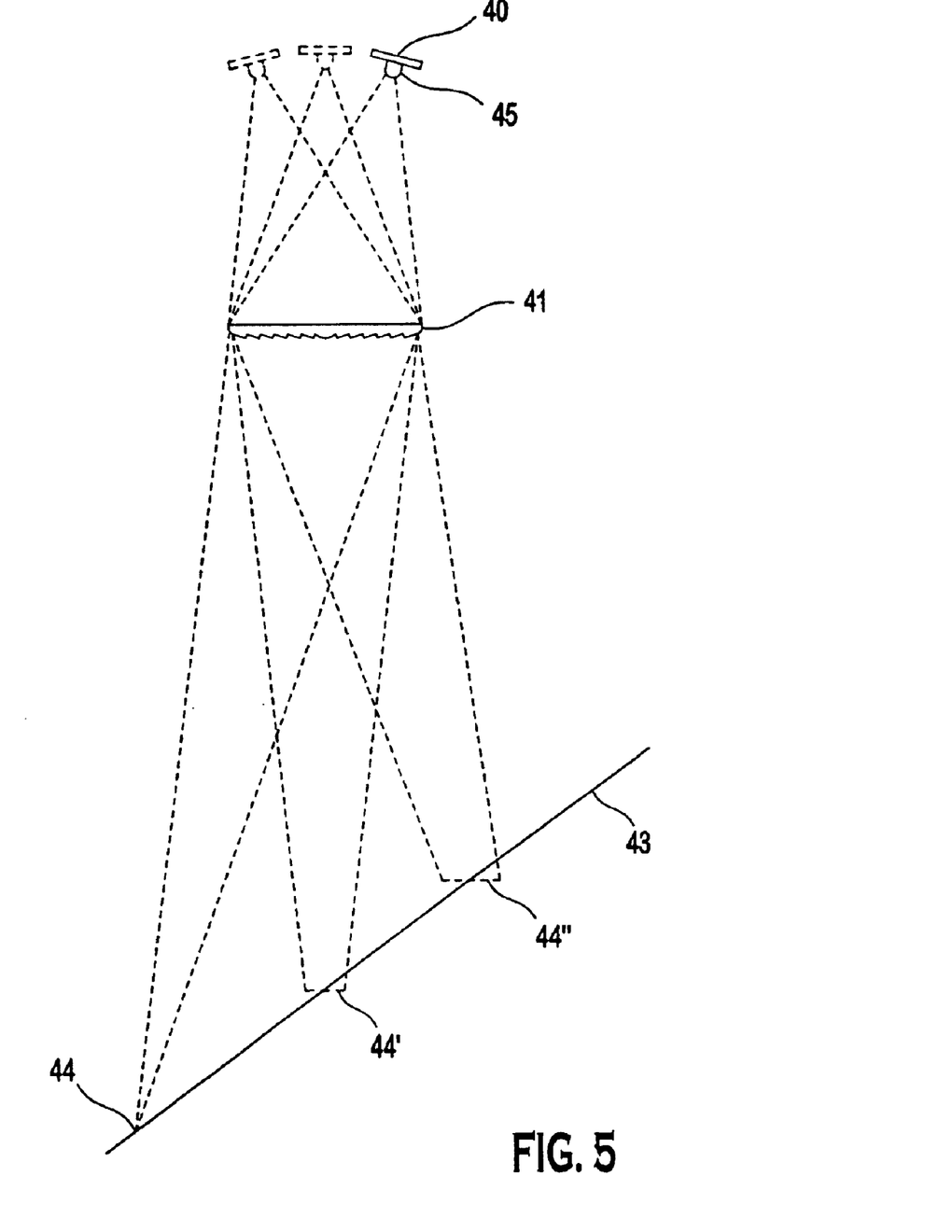
FIG. 5 is a side isometric view of a multiple row large depth of field illuminator in accordance with the present invention.

As shown schematically in FIG. 5, the position of the off axis light source 40 is infinitely variable. Accordingly, the illumination stripe 44, 44', 44" can be shifted to multiple positions depending on the required depth of field along the axis 43.

Figure 6:
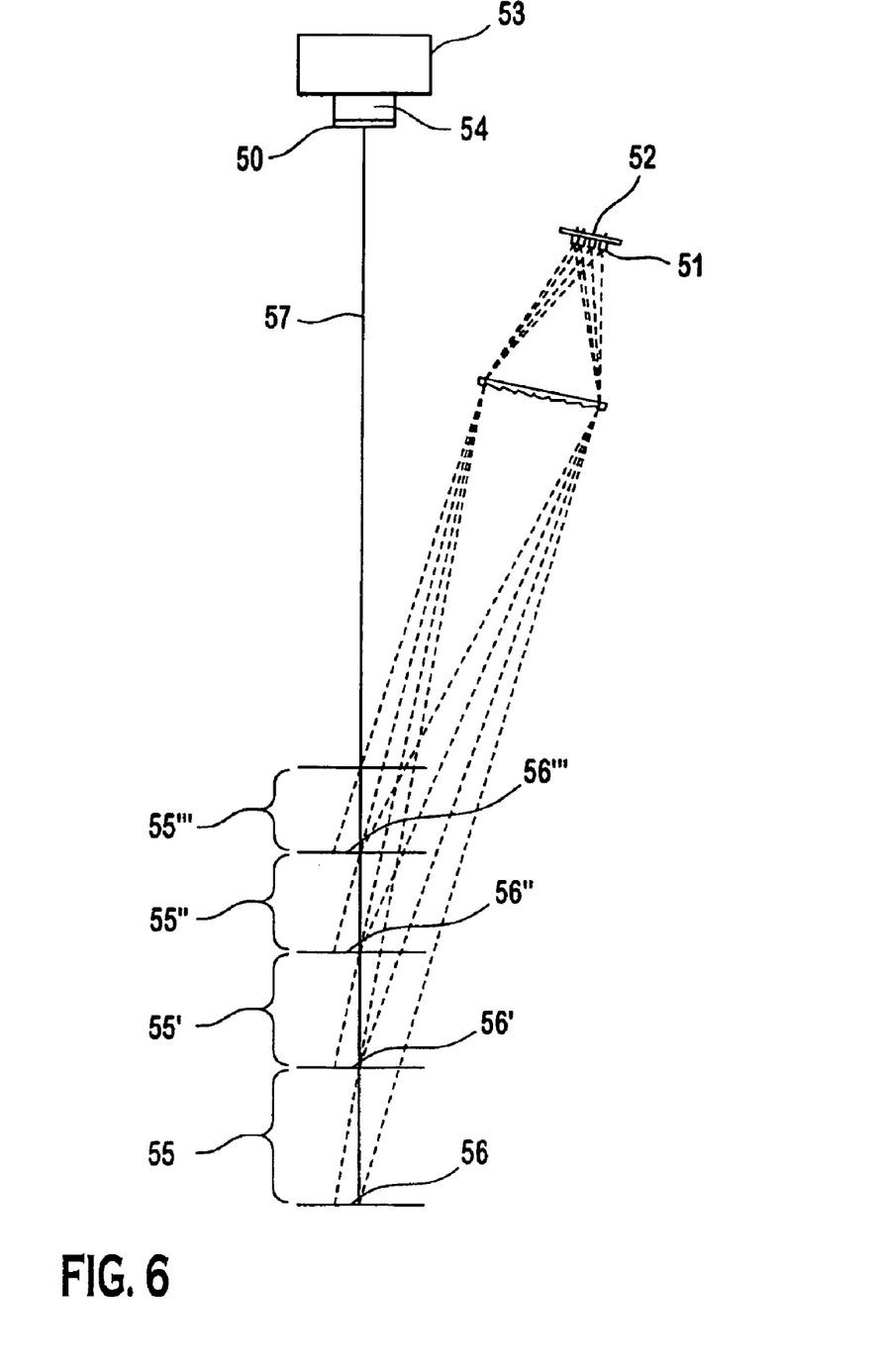
FIG. 6 is an end view of a movable light source in accordance with the present invention.

Referring to FIG. 6, a third embodiment of the invention is shown which includes multiple arrays of light sources 51 which are located on one or more circuit boards 52 placed off-axis to the lens 53 and the linear array sensor. A range finder 50 is connected to the array of light sources 51. The range finder 50 determines distance between the camera and the target object. The distance data is sent to a controller which then powers on or off selected arrays of light sources 51 focused to a corresponding depth of field 55, 55', 55", 55'" providing an illumination stripe 56, 56', 56", 56'" coplanar to the camera lens axis 57. The camera 53 and lens 54 detect the reflected light from the illumination stripe to read required data from the object. Alternatively, all of the light sources 51 may be activated to provide the desired illumination stripe at any depth of field, eliminating the need for the distance to the target object.

Figure 7:
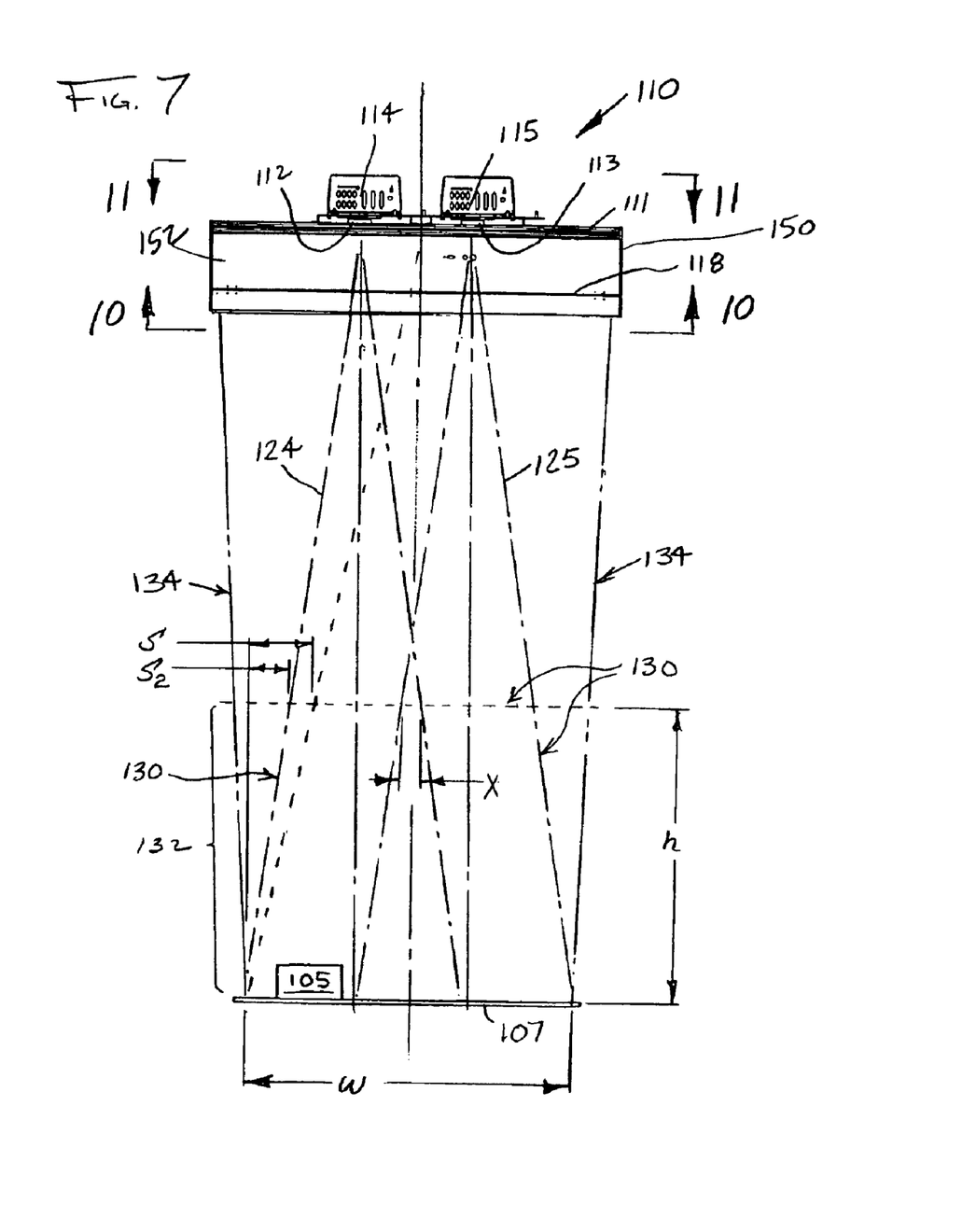
FIG. 7 is an elevational view of another embodiment of the invention including two optically coplanar cameras.
Figure 8:
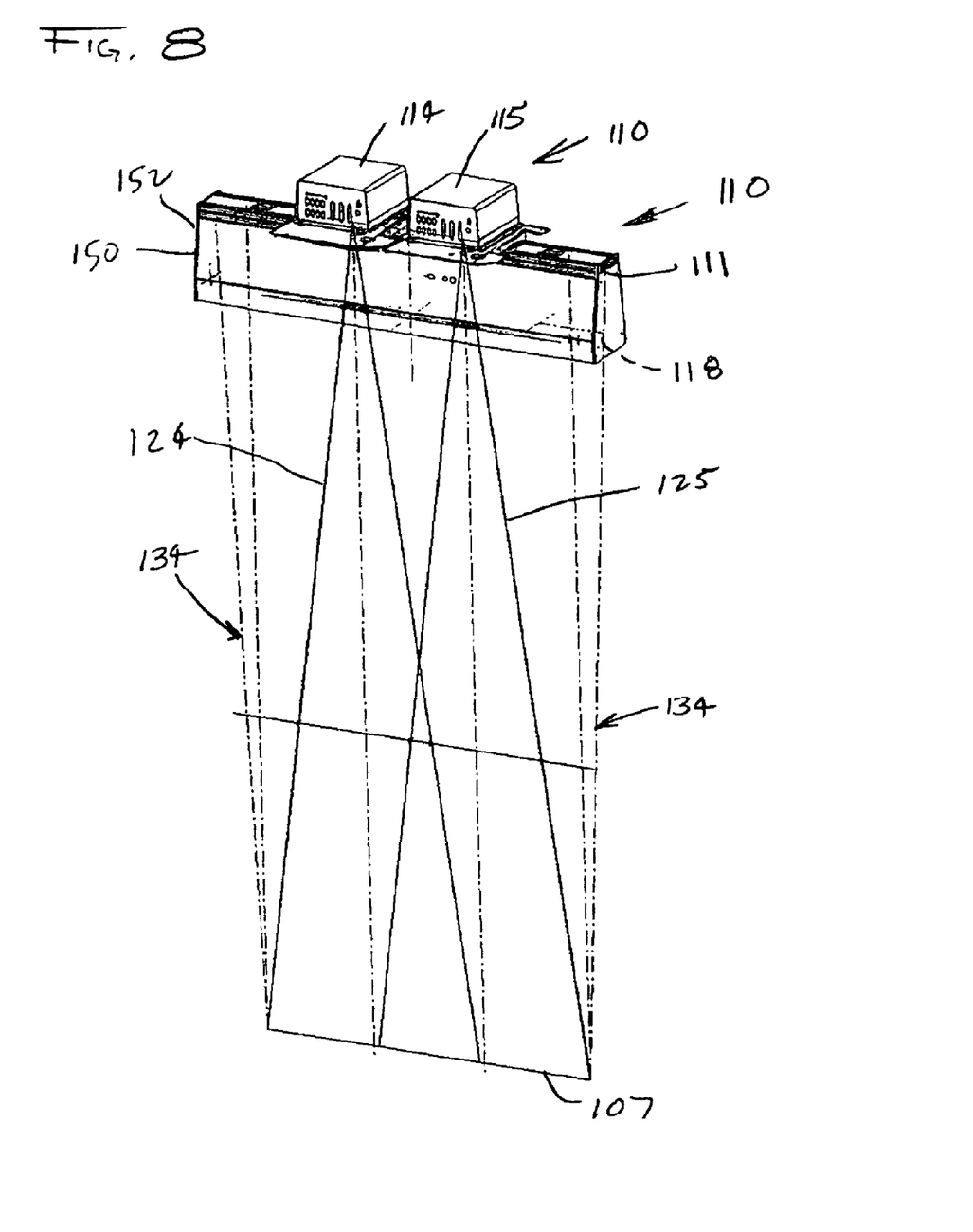
FIG. 8 is a perspective view showing the system field of view of the coplanar cameras of FIG. 7 and the focusing of the illumination beam across a depth of the system field of view
Figure 9:
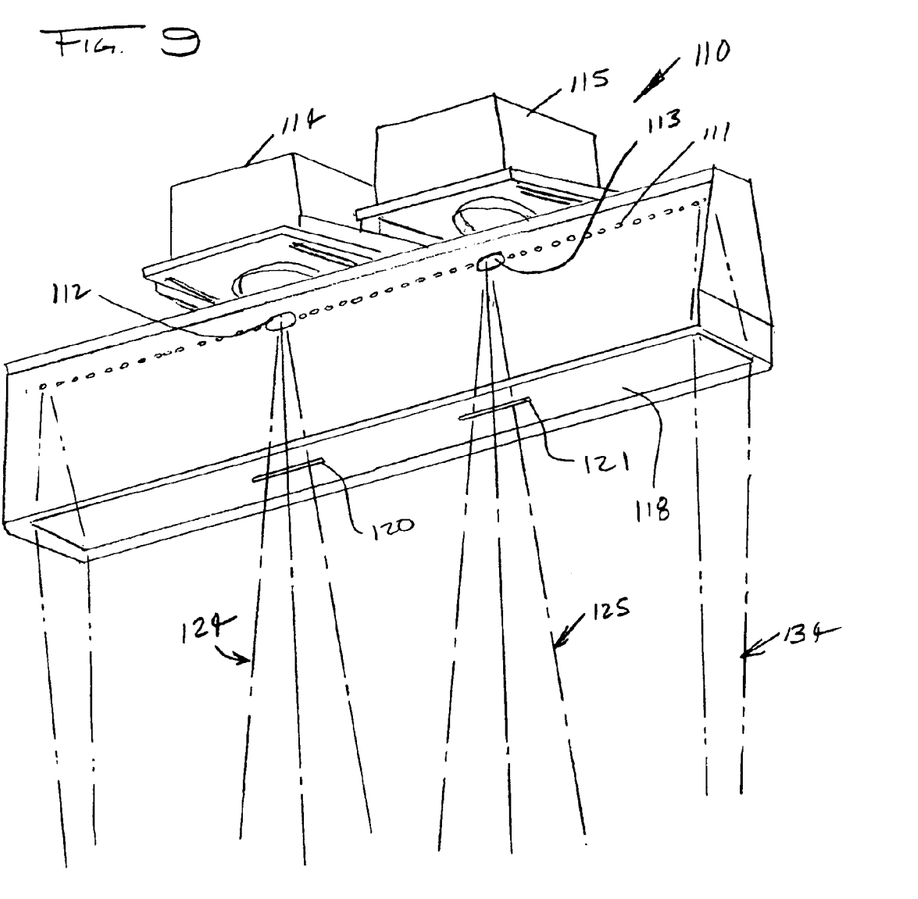
FIG. 9 is an enlarged isometric view of the scanning system of FIG. 7.
Figure 10:
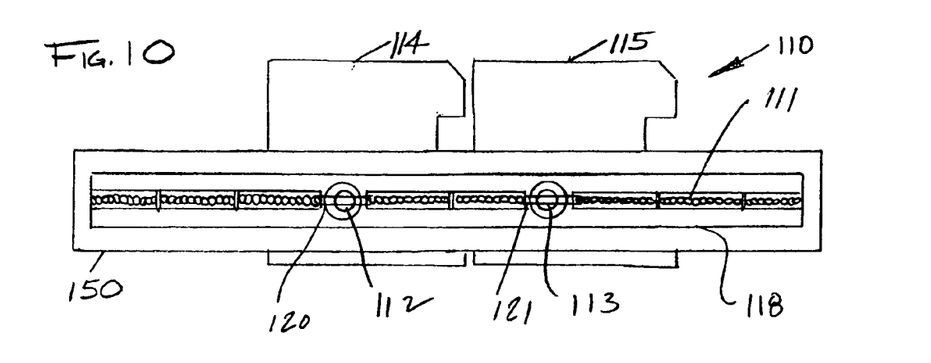
FIG. 10 is a bottom view taken along lines 10—10 in FIG. 7, showing the two camera lenses located in a generally optically coplanar position with the light source.
Figure 11:
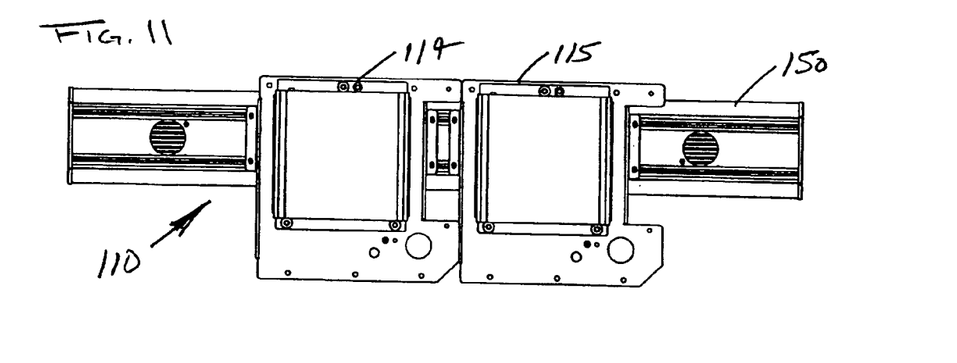
FIG. 11 is a top view taken along lines 11—11 in FIG. 7.
Figure 12:
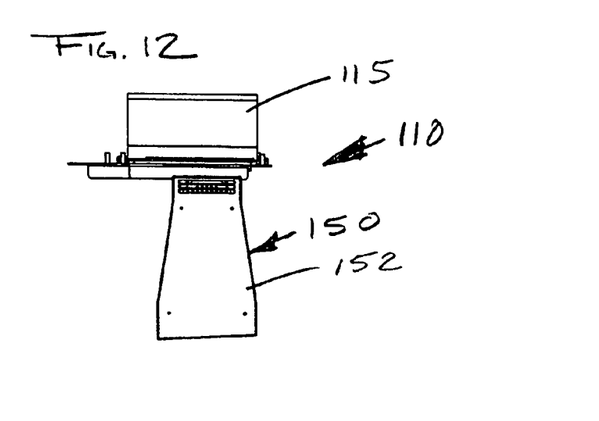
FIG. 12 is a side view of the coplanar camera system of FIG. 7.

Referring now to FIGS. 7–12, a fourth embodiment of a system 110 for scanning an object 105 in an object scanning area on a support surface 107 is shown. The support surface 107 is preferably in the form of a conveyor or other moving surface upon which objects are carried. The system 110 includes at least two linear array sensors 114, 115 to detect light input signals. A sensor lens 112, 113 is optically connected to each of the at least two linear array sensors 114, 115, with each of the lenses 112, 113 being adapted to receive and transmit an optical image located in a respective optical field of view 124, 125 to the respective one of the at least two linear array sensors 114, 115. A light source 111, similar to the light source 11 described above is also provided, and is preferably in the form of an array of LEDs or an array of semiconductor lasers, as shown in FIGS. 9 and 10. The arrays are preferably linear and are directed toward a lens 118, which is preferably in the form of a cylindrical lens or Fresnel lens, such as described above in connection with lens 18. The light source 111 in connection with the lens 118 produces an illumination plane 134 that has a height (h) that extends over a depth of field 132 and a width (w) that extends across the support surface 107 so that an illumination stripe is formed on a surface of the object 105 in the system field of view 130. The illumination plane 134, indicated by the two lines shown, and the system field of view 130 are generally coplanar over the depth of field 132 in the object scanning area.

As shown most clearly in FIG. 8, the illumination plane 134 has a tapering thickness that extends from a greatest thickness, adjacent to the lens 118, to a narrowest thickness, adjacent to the support surface 107. This taper will depend upon the focal length of the lens 118, but generally produces a high enough intensity illumination plane across the entire depth of field (h) so that the reflected optical image can be transmitted back to a respective one of the sensor lenses 112, 113.

Based upon an offset distance from the support surface 107 to the linear array sensors 114, 115, the system field of view 130 has a generally uniform resolution across the depth of field 132. This is in contrast to the previously described embodiments of the invention where there is a more pronounced change in resolution from the shortest throw distance between the linear array sensors 114, 115 and a surface of an object 105 to be scanned that has a height of about h, and the longest throw distance for a short object. This is a function of the angle between the support surface 107 and the lines defining the respective fields of view 124 and 125 of the linear array sensors 114, 115. The closer that the lines defining the fields of view 124, 125 come to vertical, the more uniform the resolution across the depth of field, generally following a sine function of the angle. This has a practical limit based upon a height for the system 110 above the support surface 107 and the number of linear array sensors 114, 115 which can be utilized.

A benefit of the system 110 is that the system field of view 130 has an effective width factor (ew) that is greater than that for a single sensor system. Still with reference to FIG. 7, for the system according to the invention ew>(w−s)h, where s is an offset distance at the height h for a single field of view system, as represented schematically in FIG. 7. Utilizing the present embodiment of the invention with at least two linear array sensors provides an offset distance $s_2$, as shown in FIG. 7, which results in an effective width factor ew=(w−$s_2$)h. In a preferred embodiment, $s_2$<0.8s, and more preferably is less than 0.7s, resulting in a greater effective width for scanning objects which are carried along the support surface 107.

A further benefit of the system 110 is the ability to independently focus each lens 112, 113 and sensor 114, 115 on a different throw distance. Independent focus provides optimum focus on each surface where a single item 105 has two or more surfaces that are at different heights from the support surface 107 or where two or more items are present that have surfaces at different heights from the support surface 107.

In the preferred embodiment, the linear array sensors are CMOS image sensors and the light source lens 118 has a plurality of openings 120, 121, as best shown in FIG. 9, to allow reflective light from a surface of the object 105 to return to the at least two of the linear array sensors 114, 115 without being effected by the light source lens 118. The two linear array sensors may also comprise CCD image sensors, as noted above.

Preferably, the system 110 has the linear array of LEDs or semiconductor lasers, as well as an axis of the light source lens 118 and the illumination plane 134 located coplanar with one another. Additionally, preferably the at least two linear array sensors 114, 115 are coplanar with the linear array of LEDs or semiconductor lasers as well as the axis of the light source lens 118 and the illumination plane 134. While this is preferred, those skilled in the art will recognize that the critical aspect of the invention is providing the system optical field of view 130 in a generally coplanar location with the illumination plane 134 over the entire depth of field 132.

The use of at least two linear array sensors requires some overlap x between the two fields of view 124, 125 so that the known size barcodes or other labels can be read entirely by one of the linear array sensors 114, 115, without the need for advanced logic for combining partial codes read by different sensors. In a preferred embodiment, x equals approximately three inches, and the controller for the linear sensor arrays 114, 115 is preferably set to discriminate so that only a single reading of one label is taken in the event that the entire label falls within both fields of view 124, 125 of the individual linear sensor arrays 114, 115. However, in some applications, multiple readings are permitted and are passed on to a system controller for further evaluation in connection with the dimensioning and/or other data relating to the object 105 on the support surface 107.

The system 110 can also be used in connection with mass flow conveyors where objects are side by side. In this case, the cameras are independently focused and there is significant overlap of the two fields of view 124, 125 of the sensor arrays 114, 115 so that the two fields of view each cover substantially the entire belt, less a width of the narrowest object.

The system 110 can also be used in connection with scanning irregular shaped objects having varying heights. In this case, the cameras are again focused independently and there is again a significant overlap of the two fields of view 124, 125 of the sensor arrays 114, 115 so that the two fields of view each cover substantially the entire belt. This provides a higher performance system with a greater read rate.

The invention thus allows coverage over a wider support surface and/or a higher density read by the linear array sensors 114, 115. Additionally, the use of at least two linear array sensors 114, 115 results in more uniform resolution and less image distortion over a height h of the depth of field 132.

Preferably all of the system components described above are packaged inside a read head assembly 150 which includes camera modules that house the linear array sensors 114, 115, an illumination module that includes the light source 111 in the form of LEDs or semiconductor lasers with the focusing lens 118, and a controller for operating the sensors 114, 115 and the light source 111. These are preferably mounted in a housing 152 which can be constructed using any conventional means, but is preferably made of sheet metal or polymeric or other metallic materials.

In the preferred embodiment, the lenses 112, 113 have a fixed focal length; however, it is also possible to provide an adjustable focal length lens for the linear sensor arrays 114, 115, in the same manner as described above in connection with the prior embodiments of the invention.

While the preferred embodiments of the invention have been described in detail, the invention is not limited to the specific embodiments described above, which should be considered exemplary. Further, modifications and extensions of the present invention may be developed based upon the foregoing, all such modifications are deemed to be within the scope of the present invention as defined by the appended claims.

What is claimed is:

1. A system for scanning objects in an object scanning area on a support surface comprising:
   at least two linear array sensors adapted to detect light input signals;
   a sensor lens optically connected to each of the at least two linear array sensors, each of the lenses being adapted to receive and transmit an optical image located in a respective optical field of view to the respective one of the at least two linear array sensors, the optical fields of view at least partially overlapping to create a system field of view;
   a light source with a lens that produces an illumination plane that has a height that extends over a depth of field and a width that extends across the support surface so that an illumination stripe is formed on a surface of the object in the system field of view; and
   the illumination plane and the system field of view of the at least two linear array sensors are coplanar over the depth of field in the object scanning area.

2. The system of claim 1, wherein the system field of view has a generally uniform resolution across the depth of field.

3. The system of claim 1, wherein the system field of view has an effective width factor of $ew > (w-s)h$ across a predefined support surface width w for the depth of field h, where s is an offset distance at the height h for a single field of view.

4. The system of claim 3, wherein $ew = (w-s_2)h$, where $s_2 < 0.8s$.

5. The system of claim 4, wherein $s_2 < 0.7s$.

6. The system for scanning objects of claim 1, wherein the light source lens is a cylindrical lens.

7. The system of claim 6, wherein the cylindrical lens is a Fresnel lens.

8. The system for scanning objects of claim 1, wherein each of the at least two linear array sensors comprises a CCD image sensor.

9. The system for scanning objects of claim 1, wherein the linear array sensors are CMOS image sensors.

10. The system for scanning objects of claim 1, wherein the light source lens has a plurality of openings to allow reflected light from the surface of the object to return to the at least two of the linear array sensors without being effected by the light source lens.

11. The system for scanning objects of claim 1, wherein the light source is an array of LEDs.

12. The system for scanning objects of claim 11, wherein the array of LEDs is linear.

13. The system for scanning objects of claim 12, wherein the linear array of LEDs, an axis of the light source lens and the illumination plane are coplanar.

14. The system of claim 13, wherein the at least two linear array sensors are coplanar with the linear array of LEDs, an axis of the light source lens and the illumination plane.

15. The system for scanning objects of claim 1, wherein the light source is an array of semiconductor lasers.

16. The system for scanning objects of claim 15, wherein the array of semiconductor lasers is linear.

17. The system for scanning objects of claim 16, wherein the linear array of semiconductor lasers, an axis of the light source lens and the illumination plane are coplanar.

18. The system of claim 17, wherein the at least two linear array sensors are coplanar with the linear array of semiconductor lasers, an axis of the light source lens and the illumination plane.

19. The system of claim 1, wherein each of the at least two linear array sensors is independently focused at various heights in the depth of field.

* * * * *